Patented Nov. 16, 1937

2,099,176

UNITED STATES PATENT OFFICE 2,099,176

ALUMINOUS CEMENTS

Edward W. Scripture, Jr., Shaker Heights, Ohio, assignor to The Master Builders Company, Cleveland, Ohio, a corporation of Ohio No Drawing. Application September 28, 1936, Serial No. 102,889

10 Claims. (Cl. 106—24)

This invention relates to aluminous cements which are obtained by fusing or sintering a mixture, in suitable proportions, of aluminous and calcareous materials and grinding the resultant product to a fine powder.

Bied concentrated on the study of cements of high alumina content and this work resulted in the patenting (British Patent No. 8,193 of 1908) of a cement manufactured by fusing together a bauxite or other aluminous and ferruginous material of low silica content with lime in proportions approximating to the formula $CaO.Al_2O_3+2 CaOSiO_2$. The cement thus obtained proved not only to have the desired properties of sulphate resistance but to show in addition a rapidity of hardening far surpassing that of the Portland cements then manufactured.

Contemporaneously with the work of Bied, patents were taken out by H. S. Sparkman (U. S. 903,017-18-19-20, 1,029,953, 1,029,954, 1,142,989). Sparkman had worked along different lines from those of Bied, his object being the production of a material rather of the nature of a pozzuolana to be added to lime or Portland cement to enhance its cementing qualities. Sparkman's aluminate compounds were prepared by adding bauxite to high alumina slags. A number of natural cements containing additions of Sparkman's calcium aluminate compounds were marketed in the United States about 1910 under the name of Alca natural cements, but their manufacture was later abandoned.

Aluminous cements were originally manufactured in a water cooled vertical furnace. This type of furnace has been superseded by a reverberating open-hearth. Electric furnaces have also been used at a number of plants in Europe. Aluminous cement is also produced by fusion in a rotary kiln of a type similar to that used in Portland cement manufacture.

Aluminous cement is composed essentially of, roughly, equal proportions of alumina and lime, a fairly large content of iron oxides running up to 15 or even 20%, and a small percentage of silica. A typical analysis is:

| | Percent |
|---|---|
| Silica $(SiO_2)$ | 6.2 |
| Alumina $(Al_2O_3)$ | 44.2 |
| Ferric oxide $(Fe_2O_3)$ | 4.6 |
| Ferrous oxide $(FeO)$ | 6.0 |
| Titania $(TiO_2)$ | 2.2 |
| Lime $(CaO)$ | 36.9 |

The setting time of aluminous cements is similar to that of Portland cements. The effect of adding salts and other substances on the setting time may be generally summarized as follows:

| Accelerate | Retard in small amounts—accelerate in large amounts | Retard |
|---|---|---|
| Calcium hydroxide | Magnesium chloride | Sodium chloride. |
| Sodium hydroxide | Calcium chloride | Potassium chloride. |
| Sodium carbonate | Barium nitrate | Barium chloride. |
| Sodium sulphate | Acetic acid | Sodium nitrate. |
| Calcium sulphate | | Hydrochloric acid. |
| Ferrous sulphate | | Glycerine. |
| Sulphuric acid | | Sugar. |

The tensile strength of the aluminous cement mortars reaches almost its maximum value at one day, and the subsequent behavior is often somewhat erratic, a slight decrease in strength followed by an increase being observed. The strength of aluminous cement is affected very adversely by the presence of calcium chloride in the mixing water and also by gauging with sea water.

A phenomenon not infrequently observed in test pats of aluminous cement and in concretes is a powdering or dusting of the surface. This results in the formation of a thin surface which can easily be removed by rubbing with the finger. While the total heat evolved during hydration of aluminous cement is of the same order as for Portland cements, the much more rapid hydration leads to its evolution over a shorter period of time. The very rapid evolution of heat leads to the development of a high internal temperature in aluminous concrete.

It has been found that high temperatures are very deleterious to the strength of the concrete, in marked contrast with Portland cement. A high temperature during the setting and hardening period over the first 24 hours causes a considerable loss in strength and an actual regression at later ages. Whatever may be the cause, there seems little doubt that exposure to a high temperature during setting, or subsequently if the material is kept wet, very markedly affects not only the strength of aluminous cement concrete, but also its resistance to chemical attack.

Aluminous cements are distinguished from other cements by their greater resistance to chemical attack, by their greater and more rapidly developed strength and by the high temperatures which they reach during setting and hardening. This last has interfered with their practical application in spite of the first two desirable properties, because the rapid evolution of heat lowers strength, resistance to chemical attack, and produces a weak powdery surface.

It is an object of this invention to provide an aluminous cement which will develop heat less rapidly so that the temperatures reached within the mass may not be as high.

A further object is to control the time of set and the rate of development of strength so that, although the rate of setting and hardening may be slower, the ultimate strength attained may be substantially the same or only slightly lower.

I have found that if a part of the aluminous cement is replaced by certain finely divided materials of a pozzuolanic or inert nature such as the residue from the extraction of alumina from bauxite by the alkaline process, or the residue from the extraction of alumina from bauxite by an acid process, or fly ash or similar material the rate of heat evolution is materially retarded and this retardation is greater than would be expected from the decreased percentage of cement present. Even if the aluminous cement is not replaced by a proportion of any of these materials but if the material is actually added a substantial reduction in the maximum temperature attained is secured. For example, two mortar mixtures were made of 300 g. of aluminous cement and 600 g. of an ordinary concrete sand. To one of these was added 10% of bauxite residue. Each mix was placed in a well insulated steel container and a thermometer inserted in a well in the center of the mass. Temperature readings were taken at frequent intervals. It was found that the aluminous cement mortar reached a maximum temperature of 27.5° C. at the end of 5½ hours after mixing, whereas the mortar to which bauxite residue had been added reached a maximum temperature of only 20° C. after 5½ hours. The materials which I have found useful for this purpose are of a siliceous nature containing considerable percentages of silica and alumina with or without other components.

I have further found that the setting time of aluminous cement may be controlled and retarded as desired by the incorporation with the cement mix of small percentages of a number of organic chemicals such as saponin, organic compounds having long hydro-carbon chains terminated by a polar group, waste-sulphite liquor or modifications thereof by various treatments. All these compounds are characterized by their ability to decrease the amount of water required by the mortar to secure a given consistency as indicated by slump or flow tests.

I have further found that the simultaneous admixture of a bauxite residue or similar material and of an organic plasticizing agent with aluminous cement compositions permits a control of the setting time and of the rate of heat evolution to any desired degree without materially impairing the strength of the aluminous cement mortar or concrete.

To illustrate the effect of these materials on rate of hardening, the following example shows the compressive strengths at various ages of 1:3 standard Ottawa sand mortars made and tested according to standard procedure:

|  | Compressive strength—lbs./sq. in. | | | |
|---|---|---|---|---|
|  | 1 day | 3 days | 7 days | 28 days |
| Aluminous cement | 6838 | 7474 | 6647 | 6902 |
| Aluminous cement +0.1% dried waste liquor residue | 0 | 5312 | 6106 | 7188 |

As an example of the composition which I employ, I use

Aluminous cement_____lbs__ 9
Bauxite residue_____lb__ 1
Dry waste sulphite liquor residue____grams__ 4.5 but I do not limit myself to these proportions or to these precise materials.

It will be seen that the addition of the waste liquor residue has retarded the rate of setting and the rate of hardening so that at one day the mortar has practically no strength, whereas the mortar without this addition has attained substantially its maximum strength. At three days, however, the mortar with the addition has attained a very considerable strength and at the age of 28 days the ultimate strength of the mortar with the retarding addition has acquired greater strength than the aluminous cement mortar without addition.

It will be obvious that these additions to aluminous cements may be made either individually or together either at the time of manufacture of the cement or at the mixer when the cement is used or at any intermediate stage.

I have also found that aluminous cements with these modifications and additions are advantageously used in conjunction with a metallic aggregate for use integrally in the mortar or concrete or for use as a dry shake applied to the surface of the mortar or concrete before it has taken on a final set and floated and trowelled into the surface in the customary manner.

I have further found that these modifications of aluminous cements are equally useful when used in conjunction with integral waterproofing materials such as stearates or emulsions of oils in the mortar or concrete.

In the making of concretes by the method of the present invention the amount of bauxite or other finely divided siliceous material should be from 5% to 20% of the weight of the cement. When waste sulphite liquor is used the proportion should be .05% to .3% of the weight of the cement.

Furthermore, it is to be understood that the particular aluminous cement described, and the particular procedure set forth, are presented for purposes of explanation and illustration and that various modifications of said product and procedure can be made without departing from my invention as defined in the appended claims.

What I claim is:

1. The process of making aluminous cement concrete which comprises mixing with aluminous cement, waste sulphite liquor residue.

2. The process of making aluminous cement concrete which comprises mixing with aluminous cement, finely divided bauxite residue, and waste sulphite liquor residue.

3. A cement composition comprising aluminous cement, bauxite residue, waste sulphite liquor residue, and metallic aggregates.

4. The process of making aluminous cement concrete which comprises mixing with aluminous cement, 5% to 20% by weight of cement of finely divided bauxite and .05% to .3% by weight, of waste sulphite liquor residue.

5. A cement composition comprising aluminous cement, 5% to 20% by weight of cement, of finely divided bauxite residue, and .05% to .3% by weight of waste sulphite liquor residue.

6. The process of making aluminous cement concrete which comprises mixing with aluminous cement waste sulphite liquor and pozzuolanic material.

7. The process of making aluminous cement concrete which comprises mixing with aluminous cement the active, hydration-retarding ingredients of waste sulphite liquor and a finely divided heat controlling material containing silica and alumina.

8. A cement composition for making concrete or mortar comprising aluminous cement, aggregate and waste sulphite liquor.

9. A cement composition for making concrete or mortar comprising aluminous cement, waste sulphite liquor, aggregate and bauxite residue.

10. A cement composition for making concrete or mortar comprising aluminous cement, aggregate, waste sulphite liquor, bauxite residue and a waterproofing agent.

EDWARD W. SCRIPTURE, Jr.